United States Patent Office 3,017,296

Patented Jan. 16, 1962

3,017,296

PROCESS FOR MAKING PHOTOCONDUCTIVE LEAD SULFIDE FILMS

Joseph Stanley Dunn and Frank C. Bennett, Jr., Rochester, N.Y., assignors to Eastman Kodak Company, Rochester, N.Y., a corporation of New Jersey No Drawing. Filed Feb. 19, 1957, Ser. No. 641,435
6 Claims. (Cl. 117—201)

This invention relates to photoconductive cells. In one of its aspects, this invention relates to the manufacture of infra-red sensitive lead sulfide photoconductive cells.

The photosensitivity of lead sulfide has been known for many years and crystalline lead sulfide surfaces have been prepared by various methods which can be divided into two groups, generally referred to as chemical deposition and vacuum evaporation, respectively. Cells prepared by both procedures have been used for the past several years.

In the chemical deposition procedure, one of the methods employed for producing lead sulfide cells involves the use of an aqueous solution of a lead salt, such as lead nitrate dissolved in excess alkali. The lead salt solution is mixed with a thiourea solution and, after a suitable period of time, a glass plate or other surface to be coated is immersed in the resulting mixture. Subsequently, the glass plate is removed from the bath containing the coating mixture and washed and dried to form the desired photoconductive cell.

In the past it has been found desirable to add a relatively small amount of sodium sulfite to the thiourea solution prior to mixing with the lead salt solution in order to improve the sensitivity of the cell produced in accordance with the chemical deposition process. In accordance with our invention, we have found that photoconductive lead sulfide cells of improved signal strength and of substantially decreased background noise can be produced by employing sodium metabisulfite, $Na_2S_2O_5$, in the thiourea solution in place of the sodium sulfite employed heretofore.

By practicing the invention, the outstanding properties of lead sulfide cells required for their use in the various photoconductive fields are retained and, in addition, the signal strength and background noise required are improved. For example, the cells produced in accordance with this invention retain their uniformity of sensitivity. They also retain their outstanding time constant or response time. In other words, the use of the sodium metabisulfite in our process does not deleteriously effect any of the necessary properties of the lead sulfide photoconductive cells and, in addition, our invention has the desirable feature of increasing the signal strength and decreasing the background noise of our photoconductive cells.

We will describe in detail a preferred method of producing photoconductive cells in accordance with our invention. This detailed discussion also constitutes a specific example of one manner in which our invention can be practiced. In order to practice our invention, an aqueous solution of an alkali metal hydroxide, such as sodium hydroxide containing 140 grams of sodium hydroxide per liter, is formed. If desired, a copper nitrate solution having a concentration of 0.0017 M can be added to the sodium hydroxide solution in the ratio of 120 ml. of the former to 100 ml. of the latter in 120 ml. of water. To the resulting alkaline solution is added 100 ml. of fresh lead nitrate solution containing 100 grams of lead nitrate per liter of distilled water. Alternatively, lead acetate, lead chlorate or lead perchlorate can be employed as the lead salt. The resulting mixture is preferably maintained at a temperature of about 23° C., but the process can be operated at other temperatures, for example, within the range of 5 to 40° C., provided the reaction times are selected in accordance with the temperature of the mixture. A thiourea solution containing sodium metabisulfite is produced by saturating 100 ml. of water with thiourea at about 23° C. and adding about 1 gram of sodium metabisulfite. This solution is then poured into the alkaline lead nitrate solution to form a mixture which, at first, is amber in color but which darkens to gold within 1 to 10 minutes and then turns brown and finally almost black. Immediately prior to the time that the solution turns black, a seeded glass blank or plate is immersed in the solution and retained in that solution for a period of 10 to 30 minutes. However, in some instances, satisfactory cells can be produced by periods of immersion of 40 to 60 minutes.

The glass blank that is used is first cleaned thoroughly, for example, by treatment with sodium dichromate and sulfuric acid followed by rinsing with distilled water and then dried. The blank is then immersed in a seeding solution containing a lead salt such as lead nitrate, hydrogen sulfide and a stabilizing agent for stabilizing the lead sulfide in a colloidal solution. A suitable stabilizing agent is polyvinyl alcohol which also acts as a wetting agent. The clean glass plate is retained in the seeding solution for a period of about 2 hours or more, after which the seeded plate is transferred at the proper time to the lead sulfide precipitating solution.

The seeded glass plate rests at an angle in the precipitating solution so that at least one surface of the plate receives precipitated lead sulfide crystals thereon in a direction unaided by gravity. That is, the upper surface of the plate receives direct crystallization plus some crystals deposited by the settling of the precipitate in the solution. On the other hand, the undersurface of the glass plate receives only those crystals of lead sulfide that crystallize out directly unto a surface. Since the total precipitate that settles out interferes with the formation of surfaces of the highest sensitivity, the undersurface of the glass plate is more sensitive than the upper surface. To be sure of uniformly high sensitivity, it is desirable to avoid agitating or disturbing the precipitating solution during the coating operation. It is usually more convenient to wash the coated glass plate in the container in which it has been coated rather than to lift it or remove it from the container after completion of the coating operation. The washing can be carried out by placing the container for the glass plate under a water tap and the resulting washed plate is then dried and ready for use.

As indicated above, the undersurface of the glass plate is more sensitive than the upper surface. The upper surface actually receives a layer of precipitate that is less sensitive due to the physical action of the gross precipitate while the crystals are forming. Any loosely adhering crystals on the lower or more sensitive side can be gently removed by careful swabbing with a camel's hair brush before the plate is dry. The sooty coating on the upper or less sensitive side can be removed by swabbing with cotton wet with hydrochloric acid. The resulting sensitive surface is quite durable to reasonable temperatures and to a reasonable amount of handling. But, of course, small scratches or the like due to careless handling result in a photoconductive cell likely to produce excessive noise in any photoelectric system in which it is used.

For the most desirable results, the ratio of lead salt to sodium hydroxide and the ratio of copper to lead in the precipitating solution should be maintained within certain limits. For example, the alkaline solution can contain a concentration of copper between $5\times10^{-5}$ and $5\times10^{-4}$ molar. The concentration of lead can be between 0.05 and 0.06 molar and the concentration of sodium hydroxide can be between 0.55 and 0.75 molar. The thiourea concentration in the precipitating bath is preferably between 0.15 and 0.3 molar, and the concentration of sodium metabisulfite in the precipitating bath is within the range of 0.005 to 0.05 molar.

To demonstrate the advantages of using sodium metabisulfite to prepare photosensitive cells in accordance with this invention, a series of cells were prepared in the manner described above using sodium metabisulfite in the thiourea solution and control cells were prepared using sodium sulfite in the thiourea solution. For comparative purposes only those cells having a resistance within the range of 0.1 to 1 megohm were used. It was found that the cells prepared from mixtures containing sodium sulfite had average values for resistance and signal of 0.50 megohm and 3.02 volts respectively. Cells prepared from mixtures containing sodium metabisulfite had average values for resistance and signal of 0.5 megohm and 3.40 volts respectively. The superiority of the latter is quite apparent.

In another aspect of our invention the properties of lead sulfide photosensitive cells can be improved by employing sodium metabisulfite in the thiourea solution and a lower aliphatic alcohol, such as ethanol, in the lead nitrate solution in place of a portion of the water. The amount of alcohol used is such that the precipitating solution prepared by mixing the thiourea solution and the lead nitrate solution contains from about 10 to 30% by volume of alcohol. It was found that cells prepared from mixtures containing sodium metabisulfite and ethanol had an average signal value of 4.12 volts. Cells similarly prepared using sodium sulfite in place of sodium metabisulfite had an average signal value of 3.76 volts. The former is obviously significantly superior.

We claim:

1. The method of forming a photosensitive layer of lead sulfide crystals which comprises precipitating lead sulfide crystals onto a prepared surface by adding a solution of thiourea containing sodium metabisulfite to an alkali metal hydroxide solution of a water-soluble lead salt, selected from the group consisting of lead nitrate, lead acetate, lead chlorate and lead perchlorate, the temperature of the combined solutions being within the range of 5–40° C., the concentrations in the solutions when first combined being as follows: lead between 0.05 and 0.06 molar, alkali metal hydroxide between 0.55 and 0.75 molar, thiourea between 0.15 and 0.3 molar, and sodium metabisulfite between 0.005 and 0.05 molar, by immersing the prepared surface in the combined solutions to receive precipitated crystals of lead sulfide and then drying the surface containing lead sulfide.

2. The method of forming a photosensitive layer of lead sulfide crystals which comprises precipitating lead sulfide crystals onto a prepared glass plate by adding a solution of thiourea containing sodium metabisulfite to a sodium hydroxide solution of lead nitrate, the temperature of the combined solutions being within the range of 5–40° C., the concentrations in the solutions when first combined being as follows: lead between 0.05 and 0.06 molar, sodium hydroxide between 0.55 and 0.75 molar, thiourea between 0.15 and 0.3 molar and sodium metabisulfite between 0.005 and 0.05 molar, by immersing the glass plate in the combined solutions to receive precipitated crystals of lead sulfide and then drying the glass plate containing lead sulfide.

3. The method according to claim 2 wherein the glass blank is prepared for coating with lead sulfide by immersion in a seeding solution containing lead nitrate, hydrogen sulfide and polyvinyl alcohol.

4. The method according to claim 2 wherein the prepared glass plate is immersed in the combined solutions for a period of 10 to 60 minutes.

5. The method according to claim 2 wherein the sodium hydroxide solution contains copper nitrate sufficient to produce a copper concentration in the combined solutions of $5\times10^{-5}$ and $5\times10^{-4}$ molar.

6. The method according to claim 2 wherein the combined solutions contain from 10 to 30 percent by volume of ethanol.

No references cited.